United States Patent [19]
Sato et al.

[11] Patent Number: 5,566,174
[45] Date of Patent: Oct. 15, 1996

[54] MPEG INFORMATION SIGNAL CONVERSION SYSTEM

[75] Inventors: Takashi Sato, Tokyo, Japan; Imran A. Shah, Ossining, N.Y.

[73] Assignee: Philips Electronics North America Corporation, New York, N.Y.

[21] Appl. No.: 302,144

[22] Filed: Sep. 7, 1994

Related U.S. Application Data

[63] Continuation-in-part of Ser. No. 253,535, Jun. 3, 1994, which is a continuation-in-part of Ser. No. 225,193, Apr. 8, 1994.

[51] Int. Cl.⁶ .................................................. H04N 7/62
[52] U.S. Cl. ........................ 370/84; 370/108; 348/423; 386/96
[58] Field of Search ......................... 370/60, 60.1, 94.1, 370/94.2, 100.1, 108, 112, 17, 84; 348/423, 494, 500; 360/18, 19.1, 37.1, 51

[56] References Cited

U.S. PATENT DOCUMENTS

| | | | |
|---|---|---|---|
| 5,142,421 | 8/1992 | Kahlman et al. | 360/40 |
| 5,381,181 | 1/1995 | Deiss | 348/500 |
| 5,432,824 | 7/1995 | Zheng et al. | 370/84 X |

FOREIGN PATENT DOCUMENTS 2274041  7/1994  United Kingdom .

*Primary Examiner*—Melvin Marcelo
*Attorney, Agent, or Firm*—Michael E. Marion

[57] ABSTRACT

A method of transmitting timing critical data via an asynchronous channel. The timing critical data can be an MPEG transport stream of packets. The asynchronous channel can be a computer or telephone network, a digital storage media such as a digital VCR, or a digital interface. The packets are processed serially through a remuxer to obtain a constant rate and delivered to and consumed by one or more target decoders, for example, inside a TV set or in a set-top decoder. To prevent overflow of the transport buffers inside these decoders, a single monitor-scheduler is provided which monitors the transport buffers and delivers to each the packets wanted scheduled so as to avoid buffer overflow and loss of information. The method also includes restamping the transport packets with new PCRs. The remuxing scheme is simple enough to implement on DVCR or other consumer applications. Also described is a method for recording the output stream which selects out desired program material and tags the transport packets with SOA tags.

14 Claims, 7 Drawing Sheets

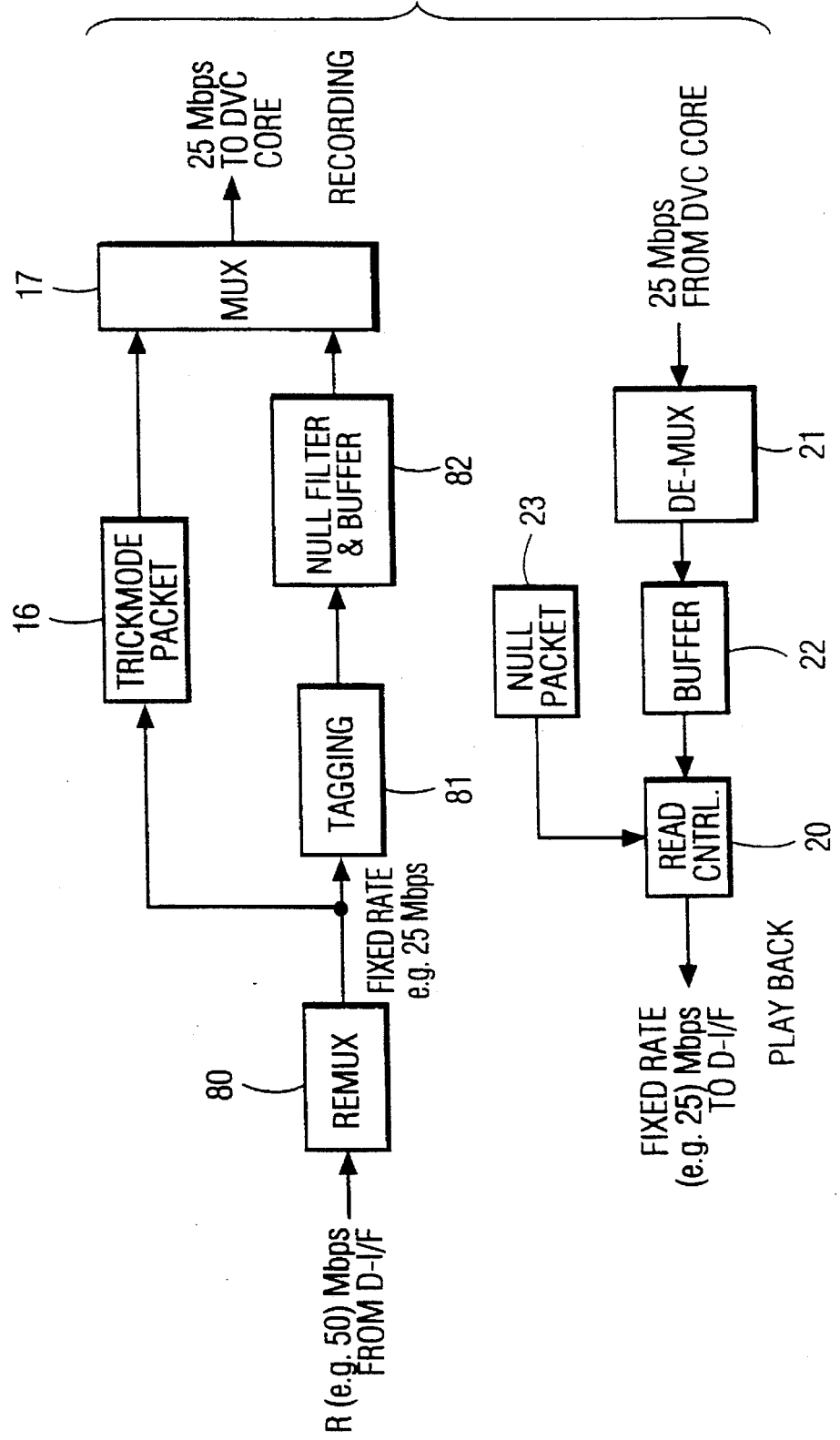

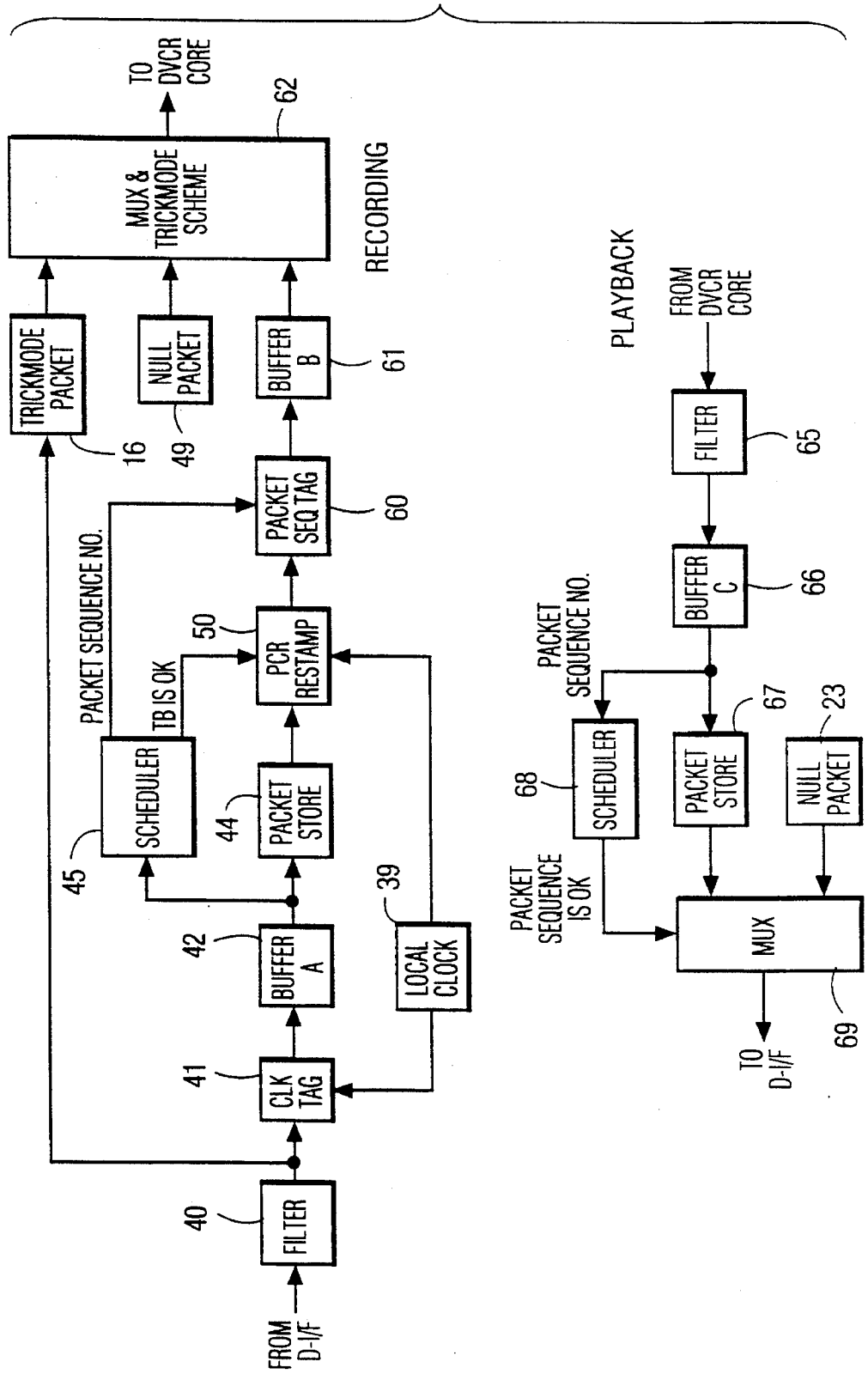

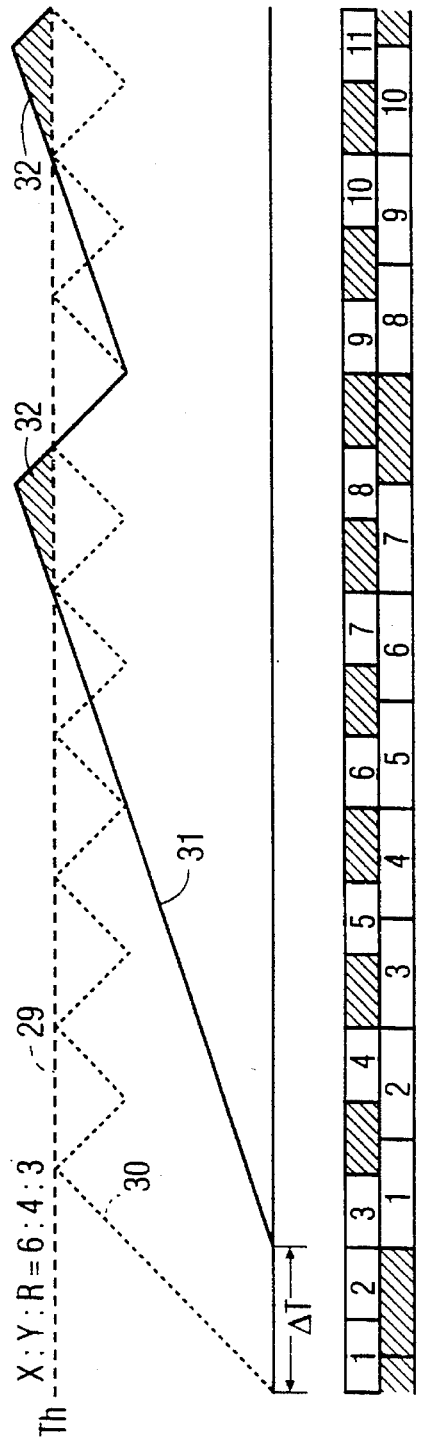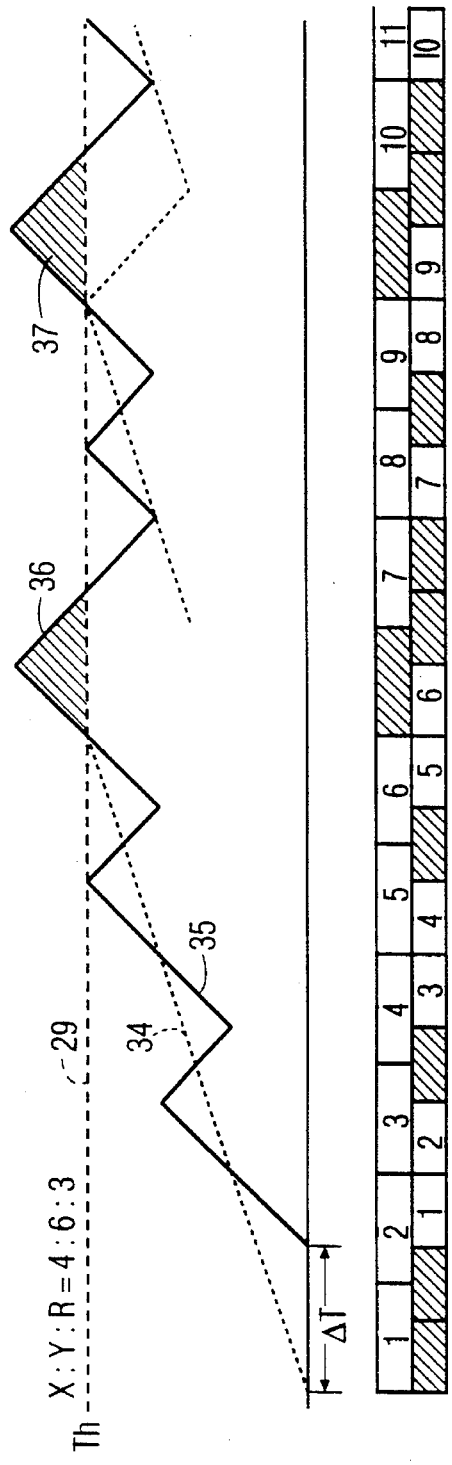

MPEG INFORMATION SIGNAL CONVERSION SYSTEM

RELATED APPLICATIONS

This application is a continuation-in-part of commonly-assigned application, Ser. No. 08/253,535, filed Jun. 3, 1994, entitled "Recording And Reproducing An MPEG Information Signal On/From A Record Carrier" in the names of R. W. J. J. Saeijs, I. A. Shah and Takashi Sato, which is in turn a continuation-in-part of commonly-assigned application, Ser. No. 08/225,193, filed Apr. 8, 1994, entitled "Recording And Reproducing An MPEG Information Signal On/From A Record Carrier" in the names of W. J. Van Gestel, R. W. J. J. Saeijs and I. A. Shah.

BACKGROUND OF THE INVENTION

The invention relates to a system for recording and playing back an MPEG information signal in tracks on a record carrier, and specifically a record carrier of the Digital Video Cassette Recorder (DVCR) type.

An MPEG information signal comprises a succession or stream of transport packets, which includes a data compressed digital video signal and a corresponding data compressed digital audio signal (and sometimes data signals), for broadcasting purposes or for transmission via a cable network. The MPEG information signal is in the form of transport packets having either an equal length or a variable length in time. In both cases, however, a transport packet comprises 188 bytes of information, the first byte of which is a synchronization byte.

A transmission such as an MPEG information signal in the form for recording on and reproduction from a record carrier, such as a magnetic record carrier as a tape, require special measures to be taken in order to realize such kind of transmission via the known tape format.

Storing a packet sequence number has its advantages if an MPEG data stream is received having a constant bit or transport rate without any gaps between packets, and comprising a number of different video programs interleaved in the MPEG data stream. Generally, such data stream may have too high a bit rate for recording the total data stream on the record carrier. For example, the MPEG bit rate for cable transmission is 45 Mbps, whereas the record carrier typically records with a 25 Mbps bit rate. The recording arrangement now comprises a program selector for retrieving one or multiple programs from the MPEG data stream so as to obtain the MPEG information signal for recording. As information corresponding to only one program is included in a MPEG transport packet, such a program selector selects, which is per se known, only those transport packets from the MPEG data stream that comprise information corresponding to wanted program(s). That means that some packets of the original MPEG data stream received are deleted. Upon reproduction, however, a valid MPEG video signal in accordance with the MPEG standard, however now comprising only the wanted programs, must be regenerated or recreated. By a "valid" MPEG signal or transport stream is meant a stream that satisfies the following requirements:

1. The program clock reference (PCR) in the packet is OK. The PCR is, typically, a 33 bit value of a sample of the local clock in the transmitter encoder. The PCR is used for clock recovery so that in the decoder, the local clock can be sync'd to the encoder local clock.
2. Accumulated change to each PCR through the network must be kept within the limit specified by MPEG.
3. The decoder transport buffers do not overflow.

Such regenerated data stream should have the transport packets that were selected upon recording in the same order. Upon recording a sequence number can be added to each transport packet received, also for any packets that will be deleted. The sequence numbers of the packets that are selected and stored may be stored in the third block section of the signal blocks in which a transport packet is stored. Upon reproduction, a sequence of numbers is retrieved, where subsequent numbers will not necessarily be next higher numbers. In that situation one or more dummy packets must be inserted so as to regenerate the replica of the original MPEG data stream.

It will also be apparent that a reproducing arrangement will be needed which is adapted to each specific embodiment of the recording arrangement, so as to enable a reproduction of the MPEG information signal recorded on the record carrier.

The two related copending applications, whose full contents are incorporated herein by reference, describe such systems which solve a problem arising from the asynchronous nature of a channel represented by the DVCR and the necessity for preserving the timing critical data incorporated in the MPEG transport stream so that it can be reconstituted as a valid MPEG information signal upon playback for reproduction on a conventional TV set. The systems described involve tagging transport packets of the MPEG data stream, before inputting to the channel, with timing information, and using the timing information at the output end of the channel to recreate the proper data timing. Various schemes are described for packing the timing information tags with each or a plurality of transmission units of the transport stream. Using this basic tagging mechanism, transport streams of various types can be recorded and played back without losing any of the information in the original transmission. Where the transport rate of the transport stream is unknown, or with gaps between the transport packets (i.e., bursty), or the transport rate changes, then the referenced related applications describe ways of handling such data streams.

When, on the other hand, the transport rate of the incoming transport stream is constant and unknown, the related applications also describe schemes for handling this situation. Thus, using a combination of Time-Of-Arrival (TOA) and Sequence-Of-Arrival (SOA) tagging as described in the related applications, an MPEG-2 transport stream of unknown but constant transport rate can be recorded and recreated on playback. In this case, however, there must not be any gaps between the transport packets at the input.

BRIEF SUMMARY OF THE INVENTION

An object of the invention is a system for recording and playback of MPEG information using a DVCR.

A further object of the invention is a system for generating a fixed-rate, constant transport stream from an incoming unknown transport stream, which is possibly at varying rate, and/or bursty.

Another object of the invention is a system for generating a fixed-rate, constant valid MPEG transport stream from an incoming unknown MPEG transport stream, which is possibly at varying rate, and/or bursty.

Still another object of the invention is a remuxing scheme for MPEG transport streams which is simple enough to implement in DVCR or other consumer applications.

In accordance with one aspect of the invention, the packets are processed serially through a remuxer to obtain a constant rate and delivered to and consumed by one or more target decoders, for example, inside a TV set or in a set-top decoder. To prevent overflow of the transport buffers inside each of these decoders, a single monitor is provided which monitors all of the transport buffers and delivers to each the packets wanted timed in a manner that will avoid buffer overflow and loss of information. This aspect of the method of the invention requires that the transport packets be restamped with a new PCR. Looked at from another view, this aspect of the invention basically involves remuxing the transport stream to a known and fixed case, and then applying the solution described in the referenced related applications for the case of a transport stream with a constant and known transport rate.

The invention is not limited to application to an MPEG information signal and can also be applied to asychronous channels other than a DVCR. In addition to transmitting MPEG data streams, there are various other applications that may require the transmission of timing critical data over an asynchronous channel. Asynchronous here means that the physical data rate of the channel is different from the transport rate, the rate of the data to be transmitted, so that the bitwise timing of data is not maintained through the channel transmission.

In the MPEG transport stream as an example of timing critical data, the relative arrival time of a datum which represents timing information of the transport stream, i.e., the PCR, must not be changed beyond a specified tolerance through transmission without changing the PCR value accordingly. This is because otherwise, the Phase Lock Loop (PLL) circuitry of a decoder will fail to regenerate the data clock, and the buffers may under/overflow. This problem of how to transmit timing critical data over an asynchronous channel without changing any datum to be transmitted also exists where the asynchronous channel is a computer network, a telephone network or a digital interface, e.g. P1394.

In accordance with another aspect of the invention, an improved remux method is described which does not have to perform complex de-multiplexing/re-multiplexing but relies instead on scheduling each packet without changing the order of the useful packets. This method offers the important advantage that the required hardware is much less expensive and thus easier to implement in low-cost consumer equipment.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, wherein like reference numerals depict the same or similar components.

BRIEF DESCRIPTION OF THE DRAWINGS

In the drawings:

FIG. 3 illustrates a remuxing and DVCR recording system;

FIG. 7 is a block diagram combining the system of FIG. 1 and the remuxing system of FIG. 6 as one form of another embodiment of the invention;

FIGS. 8A and 8B are graphs illustrating the effects of a remuxing scheme which does not monitor the transport buffer under two different conditions;

DETAILED DESCRIPTION OF THE PREFERRED EMBODIMENTS

In order to better understand the invention, we will first describe the system described and claimed in the two related applications for handling a transport stream with a constant, known transport rate.

Figure 1:
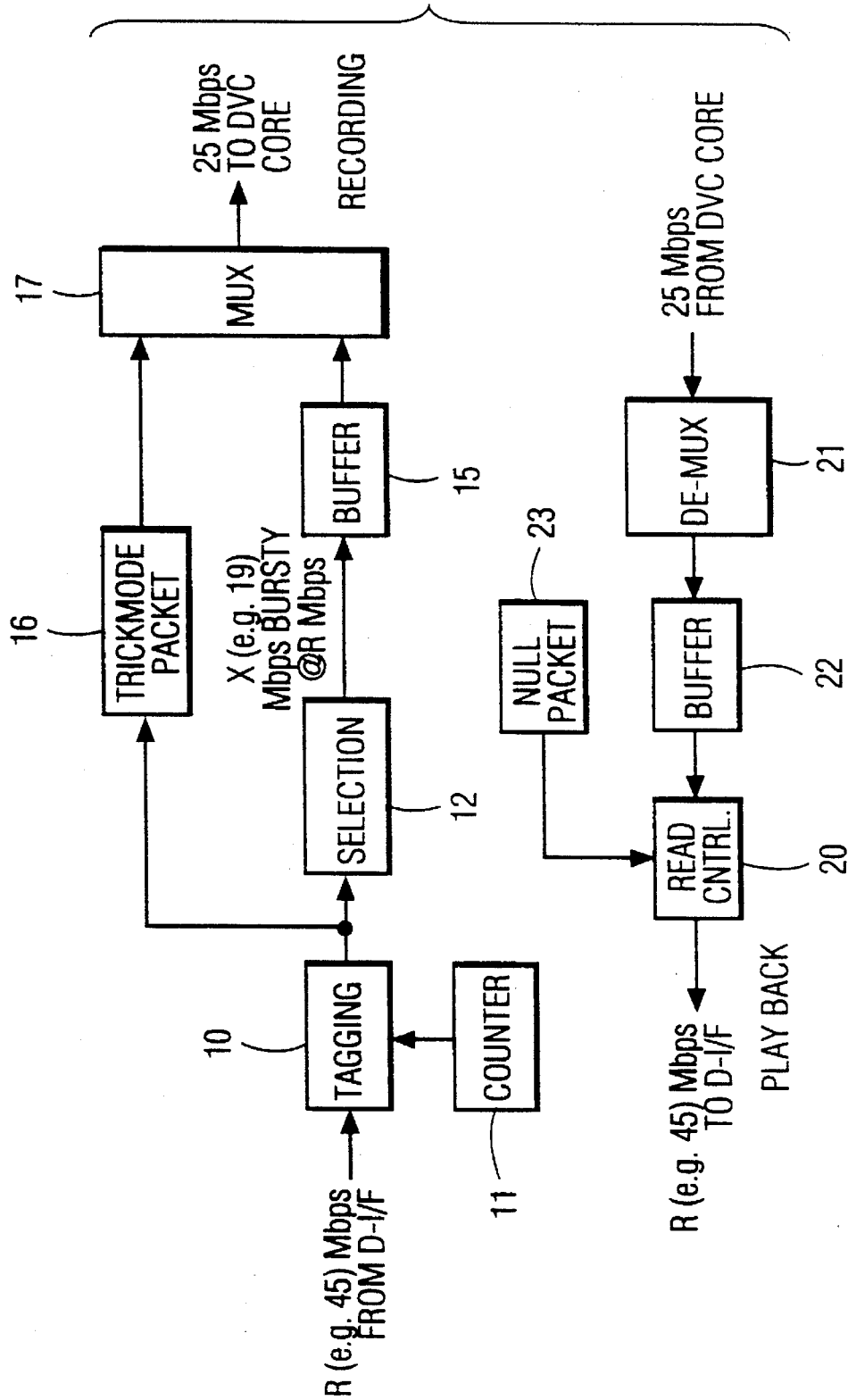
FIG. 1 corresponds to FIG. 18 of the second related application and shows a system for handling a transport stream with a known and constant transport rate, from both the recording and playback standpoints.

FIG. 1 shows such a system applied to an MPEG application where R represents the transport rate of the MPEG data stream subdivided into transmission units in the form of a succession of transport packets from a digital interface (D-I/F). In the example given, the incoming transport rate is 45 Mbps, to be recorded on a DVCR at 25 Mbps, and then recreated as a valid MPEG signal at 45 Mbps, for playback on a standard TV set.

The incoming data stream from D-I/F is received by a known tagging means 10 for tagging each incoming packet with a SOA tag requiring only a counter 11 incrementing at the arrival of each transport packet. The tagged packets then go to a selection means 12 for selecting the desired program material, and the selected packets stored temporarily in a local buffer 15. As explained in the referenced related applications, trickmode packets can be generated from the incoming transport stream at block 16 and intermixed with the desired program material by a MUX block 17 at the desired transport rate for recording on the DVCR. The tagging bits are recorded onto the DVCR tape along with the corresponding transport packets using the extra bits available from the 2 to 5 sync blocks mapping as described in the related cases.

On playback, each recorded packet is read out at its correct sequence according to the SOA stamp information under control of a read control block 20 via a local buffer 22. A DE-MUX block 21 acts to separate the packet stream, and the gaps formed by the non-selected program material packets in the output stream are filled in by supplying Null packets from a Null packet generator 23. During playback, each time a "discontinuity" in the SOA tag is detected, it is assumed to have come from a transport packet that has not been recorded. These "missing" packets are replaced with the Null packets. All transport packets are thus output at the known and constant transport rate.

Figure 2:
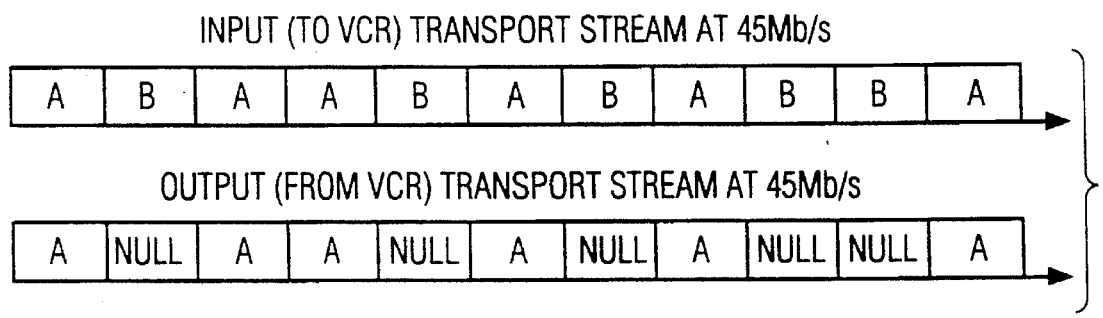
FIG. 2 shows an example of the input and output data streams from the apparatus of FIG. 1.

FIG. 2 gives an example of the transport stream resulting. In the upper diagram, as an example, the input transport stream is a two program stream: programs A and B. We wish to record only program A, and hence strip out the B packets in the selection block 12. On playback, all the packets belonging to program A are reproduced at precisely their original times and rates, and the gaps are filled in with the Null packets (lower diagram). If the input stream was a valid MPEG signal, the output stream will also be valid.

As will be clear from the foregoing explanations, to maintain the interoperability between MPEG applications, it is necessary for the DVCR to generate a valid MPEG transport stream, preferably at a fixed-rate and constant (i.e., without any gaps between packets). Generating a fixed-rate constant transport stream for input to the apparatus of FIG. 1 from an incoming unknown transport stream, which is possibly at varying rate and/or bursty, meaning that there are gaps between the packets, is equivalent to generating a new transport stream by so-called remuxing. Remuxing by DVCR is comprised of selection of necessary packets, rescheduling of the timing of each packet, and multiplexing of the selected packets with Null packets to fill out the gaps in the transport stream. Whenever remuxing is done, the following remux requirements must be met:

(a) Timing jitter of each PCR (incorporated in each transport packet) must be kept within an acceptable limit.

(b) Accumulated change to each PCR through the network must be kept within the limit specified by MPEG.

(c) Generated transport stream must not overflow the transport buffer of each elementary stream decoder.

Figure 4:
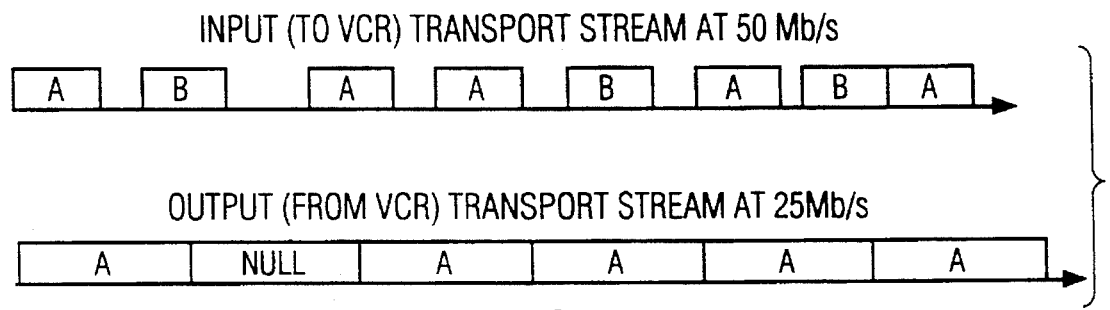
FIG. 4 shows an example of the input and output data streams from the apparatus of FIG. 3.

One form of apparatus according to the invention is illustrated in FIG. 3, a combination of SOA and remuxing. In this case, after the remuxing 80, the packet stream at the new rate is tagged 81 and any Null packets removed in the local buffer block 82. However, in this case, the duration of the output packets is different. FIG. 4 shows in the upper diagram the input stream to the remuxer 80, and in the lower diagram the output stream to the D-I/F. The transport rate is now constant, but the packets need restamping with new PCRs because the old PCRs are no longer valid. Another problem appears, illustrated in FIG. 5.

Figure 5:
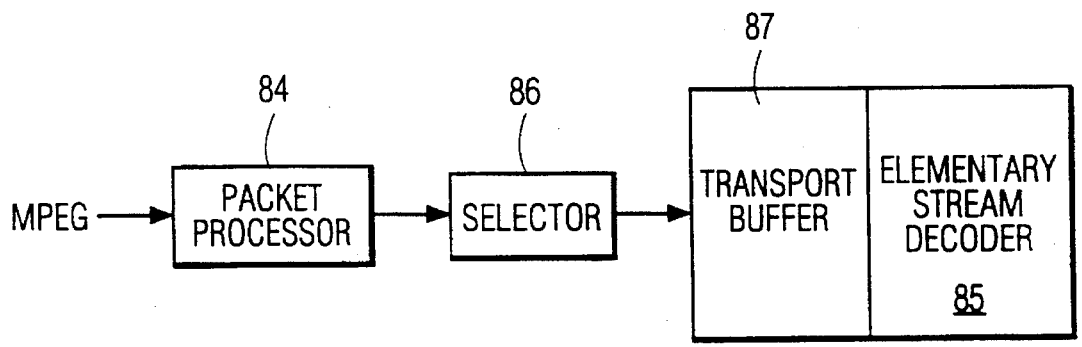
FIG. 5 is a schematic block diagram of a packet processor feeding apparatus with a target decoder.

FIG. 5 shows schematically a valid MPEG signal input to a packet processor 84, which may be the system of FIGS. 1 and 3. It outputs a valid transport stream like that of FIG. 4 (lower diagram) to, for example, a selector 86 selecting packets for each elementary stream decoder 85 which includes a transport buffer 87, referred to herein as the "target decoder" and "target buffer". For the system to perform properly, the target buffers of each decoder provided must all be managed to avoid overflow. The problems are illustrated in FIGS. 8A and 8B.

In these figures, X represents the input transport rate, Y represents the output transport rate, and R represents the read-out or emptying or leak rate of the transport buffer in the target decoder. FIG. 8A shows the effect of remuxing without monitoring of the transport buffer where R<Y<X. The row labelled Input is the sequence of input transport packets, and the row below labelled output is the sequence of output transport packets over a time t. The graph above indicates the fullness of the transport buffer over time t, with the dashed line 29 at top labelled Th representing a full buffer, and the dotted diagonal lines 30 representing the input stream. Where the solid line curve 31 representing the output stream crosses the threshold line 29, shown at 32, bits of certain output packets will be lost, which will occur with packets 7, 10, etc. The case illustrated is where the input rate is faster than the output rate.

In FIG. 8B, the case where the input rate is slower than the output rate is given, represented by R<X<Y, with the dotted lines 34 again representing the input stream, and the solid line curve 35 again representing the output stream. Here, too, without monitoring, when the curve 35 crosses the threshold line 29, shown at 36 and 37, bits of certain output packets will be lost, which will occur with packets 6, 9, etc.

A feature of the invention is a remuxing scheme for MPEG transport streams which is simple enough to implement on DVCR or other consumer applications.

This aspect of the present invention is based upon the following new concepts and understandings.

1. Incoming transport streams have small enough timing jitter; hence, requirement (a) can be met simply by restamping PCR's, using an appropriate local clock.

2. Incoming transport streams have enough head room for the PCR change; hence, the requirement (b) can be met by the remuxing scheme described below. By "head room" is meant the unused portion of the limit as defined in the MPEG standard.

General remuxing includes clock regeneration of each program, de-multiplexing of the input to separate each elementary stream, keeping track of each transport target buffer, calculation of a new schedule, re-multiplexing of the elementary streams, restamping of PCR, and so on. As will be recognized, such general remuxing requires complex software and hardware not implementable in typical low-cost consumer appliances. A feature of our invention is based on a simpler remuxing scheme, which does not perform de-multiplexing/re-multiplexing but simply schedules each transport packet without changing the order of the useful packets. This approach requires certain basic assumptions:

1. The total net rate of the wanted program(s) in the input transport stream must be less than the output transport stream rate (the remux rate);

2. The input transport stream rate can, however, be unknown, bursty and/or at any rate, higher or lower;

3. The remux rate is known, fixed and constant.

Figure 6:
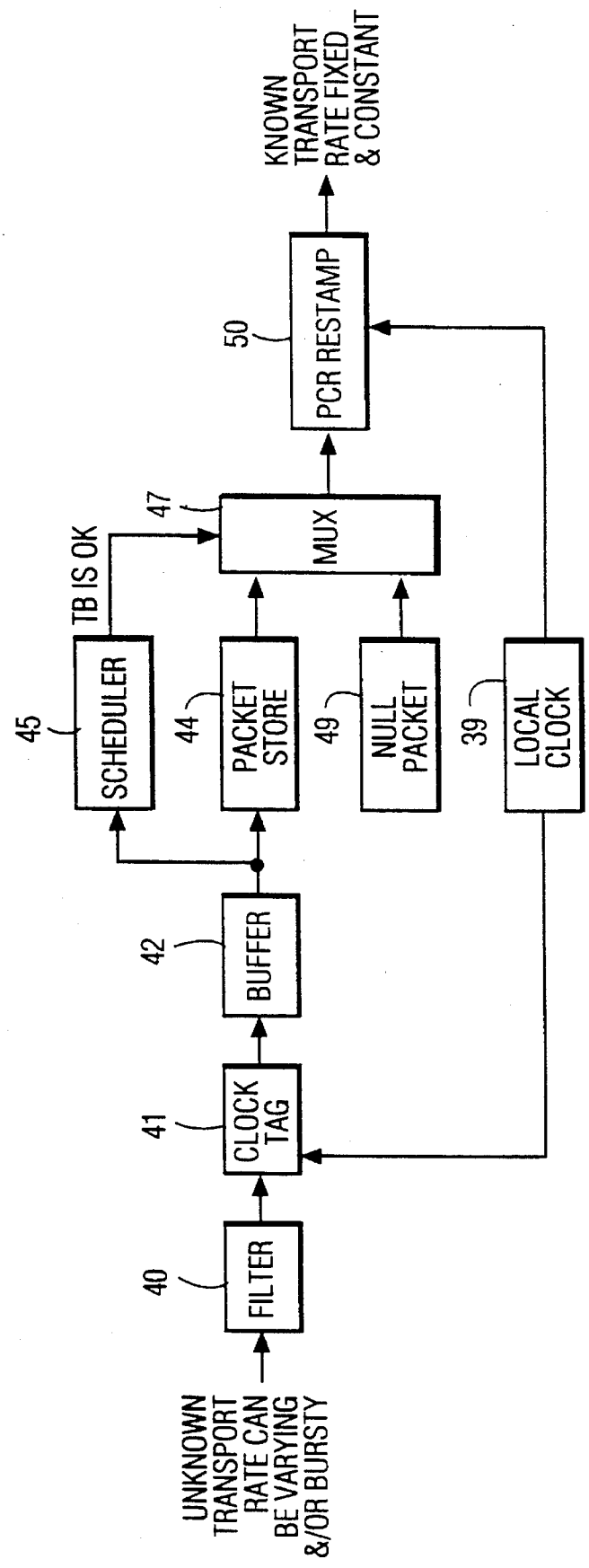
FIG. 6 is a block diagram of one form of remuxing system in accordance with the invention.

In accordance with an aspect of the method of the present invention, the remuxing goes as follows, reference being made to FIG. 6 which is a block diagram of one form of remuxing apparatus in accordance with the invention:

1. The necessary packets are selected from the incoming transport stream by a filter or selector 40.

2. The packets containing the PCR are tagged 41 with the sampled value of a local clock 39.

3. Each packet is stored and kept in a local buffer 42 until it is read out to a packet store 44.

4. Whenever the packet store 44 is empty and there is at least one packet in the buffer 42, the first packet in the buffer 42 is read out and moved to the packet store 44. Necessary information of the packet is sent to a scheduler 45 at the same time.

5. The scheduler 45 checks whether outputting of the packet in the packet store 44 will overflow the transport buffer 87 of the corresponding elementary stream decoder 85 (FIG. 5) and signals it to a MUX 47.

6. If the packet store 44 has a packet and the scheduler 45 signals that the decoder transport buffer will be OK, the MUX 47 selects and reads out the transport packet in the packet store 44. Otherwise, the MUX 47 selects and outputs a Null packet from a Null packet generator 49. The packet in the packet store 44 remains there until it is read out.

7. Each PCR value in the transport packet transmitted by the MUX is modified in a PCR restamper 50 using the following equation:

$$PCR_{new} = PCR_{old} + (Clock_{current} - Clock_{tagged}) - Delay_{max} \quad (1)$$

where, $PCR_{new}$: New PCR value after restamping;

$PCR_{old}$: Old PCR value before restamping;

$Clock_{current}$: Current Clock value at output time restamping 50;

$Clock_{tagged}$: Clock value tagged 41 at reception of the packet;

$Delay_{max}$: Maximum delay through the remux operation, which is a constant value to ensure that each PCR value never increases.

The scheduling scheme is an important feature of this invention. The main purpose of scheduling is to ensure that the transport buffers in the decoders never overflow. Scheduling of packets takes a lot of work if it is done in a brute force manner because it involves keeping track of the transport buffer fullness of every elementary stream in parallel. This may be too complicated for consumer applications apparatus, hence, we created a simpler way to do the job. This is based upon the following:

1. We can derive the transport buffer (85–88 in FIG. 5) emptying or leak rate (read-out rate) of each elementary stream from the information carried in the input transport stream. For example, the transport buffer leak rate is 54 Mbps for the Grand Alliance HD Video standard, 18 Mbps for SD Video and 2 Mbps for Audio, etc. We can know that if the remux rate is less than the transport buffer leak late, no transport buffer monitoring is necessary because the transport buffer never overflows. Hence, we can reduce the number of transport buffers that we need to monitor. Transport buffer monitoring can be further simplified using the following approaches:

1. The buffer fullness of each transport buffer increases monotonically from the beginning of each received packet through the end of the packet; hence, we need to check the buffer fullness only at the end of each packet.

2. Remux knows its own output transport rate (the remux rate) as well as the transport buffer leak rates for each elementary stream; hence, it can know how much the buffer fullness of a transport buffer will change by sending a packet and by not sending a packet to the transport buffer, using the following equations:

$$Leak = R_{leak} \cdot T_{packet} \quad (2)$$

$$Delta = S_{packet} - Leak \quad (3)$$

where,

Leak: Change of transport buffer fullness per one-packet period when transport buffer receives no packet;

$R_{leak}$: transport buffer leak rate;

$T_{packet}$: Packet period, i.e., $S_{packet}/R_{remux}$;

$S_{packet}$: Packet size;

$R_{remux}$: Remux rate;

Delta: Change of transport buffer fullness per one-packet period when transport buffer receives one packet.

Table 1 below shows an example of a parameters table that can be used for transport buffer monitoring.

|  | $Rate_{leak}$ | Leak bits (bytes) | Delta bits (bytes) |
|---|---|---|---|
| SD | 18 Mbps | 1,082 (135) | 422 (53) |
| Audio | 1 Mbps | 61 (8) | 1,443 (180) |
| Others | $\geq R_{remux}$ Mbps | NA or 0 | NA or 0 |

($S_{packet}$ = 188 bytes, $R_{remux}$ = 25 Mbps)

This table can be expanded if there are other data types which have known transport buffer leak rates and require transport buffer monitoring.

3. Using the above results, the buffer fullness of each transport buffer can be calculated using the following equations:

$$B_{prev} = B_{last}(i) - \text{Leak}(i)(C_{current} - C_{last}(i) - 1) \quad (4)$$

where, i: Index of the elementary stream which the current packet belongs to;

$B_{prev}$: transport buffer fullness of the i-th elementary stream just before receiving the current packet;

$B_{last}(i)$: transport buffer fullness of the i-th elementary stream when the transport buffer has just finished receiving the last packet;

Leak(i): transport buffer leak rate of the i-th elementary stream per one packet period;

$C_{current}$: Value of output packet counter for the current packet;

$C_{last}(i)$: Value of output packet counter for the last packet of the i-th elementary stream $$\text{If } B_{prev} < 0, \text{ then } B_{prev} = \quad (5)$$

$$B_{current} = B_{prev} + \text{Delta}(i) \quad (6)$$

where, $B_{current}$: transport buffer fullness of the i-th elementary stream when the transport buffer has just finished receiving the current packet;

Delta(i): Change of transport buffer fullness of the i-th elementary stream by receiving one packet.

The scheduling algorithm goes as follows in the preferred embodiment:

Step 1.

At every interval $T_{packet}$, check if a whole packet is in the packet store 44. If there is a packet (the current packet), go to Step 2, otherwise, go to Step 5.

Step 2.

If the transport buffer leak rate of the i-th elementary stream, to which the current packet belongs, is obtained for the first time, calculate Leak(i) and Delta(i), using equation (2) and equation (3), respectively, and initialize the parameters for transport buffer monitoring as follows, and go to Step 3:

$$B_{last}(i) = 0 \quad (7)$$

$$C_{last}(i) = C_{current} + tm \quad (8)$$

Step 3.

Calculate $B_{current}$ corresponding to the current packet, using equation (4), equation (5) and equation (6), and go to Step 4.

Step 4.

If $B_{current}$ is equal to or less than the transport buffer size, output the current packet and update the parameters as follows and go to Step 6. Otherwise, go to Step 5:

$$B_{last}(i) = B_{current} \quad (9)$$

$$C_{last}(i) = C_{current}. \quad (10)$$

Step 5.

Output a Null packet and go to Step 6.

Step 6.

Increment the output packet counter as follows and go to Step 1:

$$C_{current} = C_{current} + 1 \quad (11)$$

This simple scheduling scheme requires only a series of simple calculations per each packet period regardless of the number of the elementary streams in the transport stream and yet can prevent transport buffer overflow from happening. Moreover, as will be appreciated, where the system of FIG. 6 is employed as the packet processor of FIG. 5, it is capable of monitoring the buffer fullness in each of the target decoders 85 provided while delivering to them valid MPEG streams. This is because the above-noted algorithm can be executed each time a packet arrives at the store 44, because the scheduler 45 knows which data stream the packet belongs to, is keeping track of the packets of each separate data stream, and knows the leak rates of the respective transport buffers in the respective target decoders 85. Thus, in a serial packet processing system, a single scheduler is able to monitor multiple decoders.

If we combine the remuxing scheme explained above in connection with FIG. 3 with the overall recording proposal described in the referenced copending application, and remove redundancy, we can obtain a total DVCR solution, which is illustrated in FIG. 7. The same reference numerals as are used in FIGS. 1 and 6 represent the same components in FIG. 7. The new components which function similarly to those previously described include a packet sequencer tagger 60 corresponding to the tagger 10, a second local buffer B corresponding to local buffer 15, and a MUX 62 which muxes tagged and restamped transport packets with the trickmode and null packets in the recording part prior to recording on the media. Whereas the previous Null packets meant MPEG Null packets to create a valid MPEG stream, these null packets 49 are used merely to fill gaps in the recording stream and serve no MPEG function. In the playback part, there is provided a filter 65 that serves to strip off undesired fill packets and the resultant transport stream is stored in a local buffer C 66 corresponding to local buffer 22, a decoding packet store 67 and decoding scheduler 68 which performs the reverse functions of the scheduler 45 in the encoding part, and a MUX 69 corresponding to block 17.

Recording then goes as follows:

1. The necessary packets are selected by the filter 40.
2. The packets containing PCR are tagged 41 with the local clock 39.
3. Each packet is stored and kept in local buffer A 42 until it is read out.
4. Whenever the packet store 44 is empty and there is at least one packet in buffer A 42, the first packet in buffer A 42 is read out and moved to the packet store 44. The necessary information of the packet is sent to the scheduler 45 at the same time.
5. The scheduler 45 checks whether outputting the packet in the packet store 44 will overflow the target transport buffer of the corresponding elementary stream or target decoder, as described above, and signals it to the MUX 62.
6. If the packet store 44 has a packet and the scheduler 45 signals that the target transport buffer will be OK, the packet in the packet store 44 is read out. The packet in the packet store 44 remains there until it is read out.
7. Each packet containing PCR is restamped 50 its PCR value using equation (1).
8. Each packet is tagged 60 with its packet sequence No., which may have discontinuity due to the scheduling.
9. Each packet is stored and kept in the local buffer B 61 until it is read out.
10. The packets read out from the buffer B 61 are multiplexed 62 with trickmode packets 16 and, if necessary, null packets 49, according to a trickmode recording scheme.

Playback goes as follows:

1. The necessary packets are selected by the filter 65.
2. Each packet is stored and kept in the local buffer C 66 until it is read out.
3. Whenever the packet store 67 is empty, a packet is read out from the buffer C 66 and moved to the packet store 67. The Packet Sequence No. tag of each packet is sent to the scheduler 68.
4. The scheduler 68 checks whether the Packet Sequence No. matches an internal packet counter (not shown or incorporated in the scheduler) and signals OK if both match.
5. If the scheduler 68 signals OK, the MUX 69 selects and reads out the packet in the packet store 67. Otherwise, the MUX 69 selects and sends out a Null packet. Every packet is sent out at the remux rate. FIG. 7 thus combines the remux scheme of FIG. 6 with the necessary components to allow recording and playback from a DVCR.

Figure 9A:
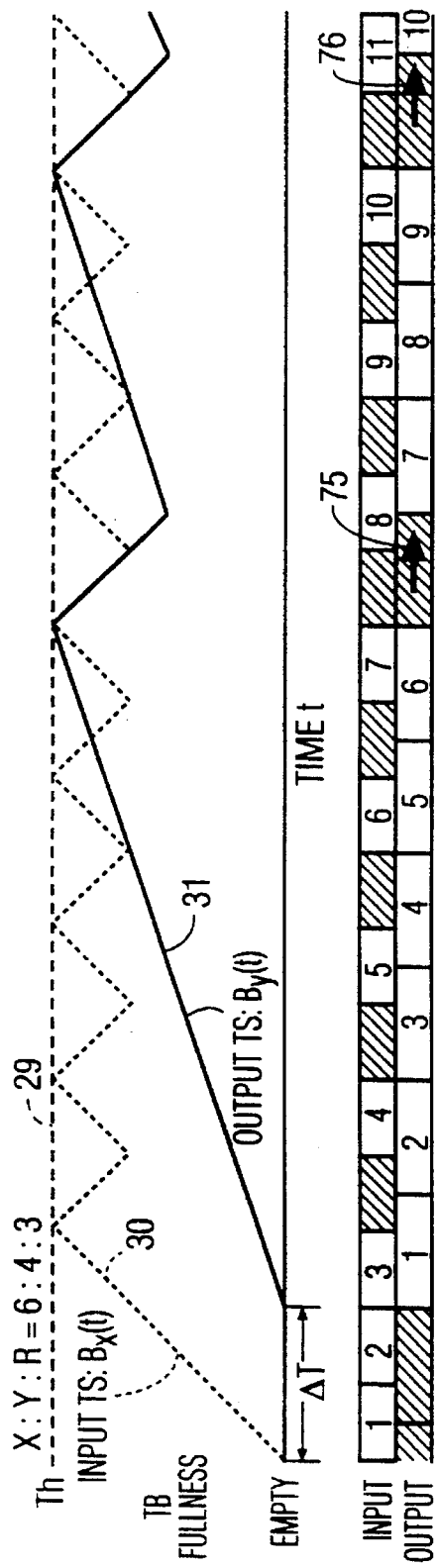
FIGS. 9A and 9B are graphs illustrating the effects of a remuxing scheme which does monitor the transport buffer under the same two different conditions of FIGS. 8A and 8B.
Figure 9B:
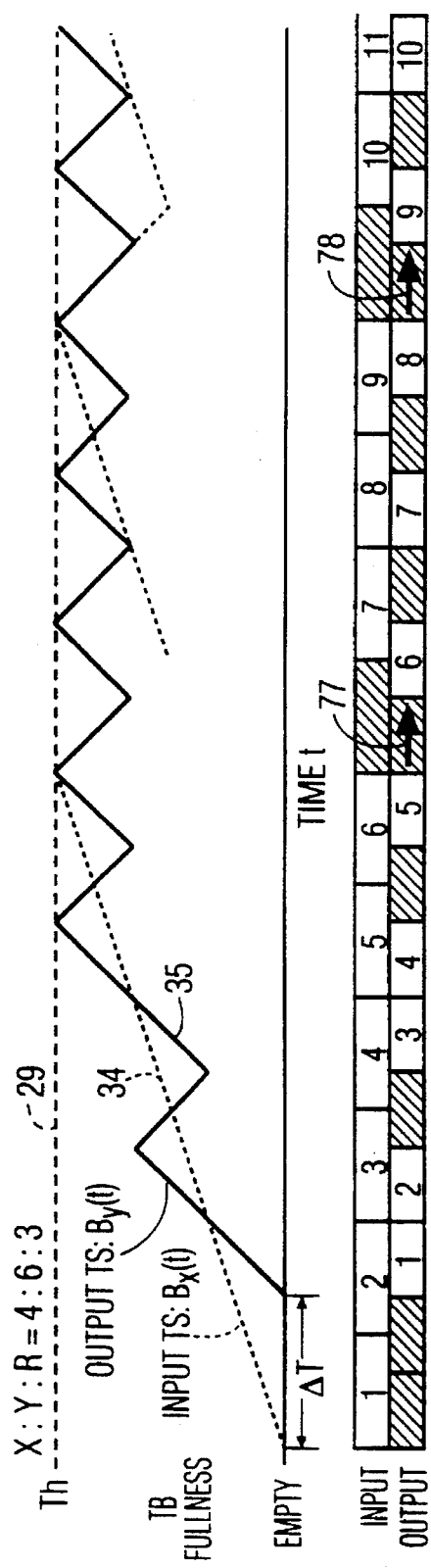

FIGS. 9A and 9B show the improvement obtained under the same conditions described above in connection with FIGS. 8A and 8B, respectively. In essence, shown in FIG. 9A, the rescheduler has delayed blocks 7 and 10, etc. (see arrows 75 and 76) long enough to prevent target buffer overflow. Similarly, blocks 6 and 9, etc. have been delayed at arrows 77 and 78 as shown in FIG. 9B to prevent overflow and loss of information.

In this way, a DVCR can reconstruct at playback, without loss of information, a transport stream that has the rate and timing exactly as scheduled by the remux at recording. With this scheme, the remux rate can be equal to or higher or lower than the recording rate as long as the net transport stream rate at the remux is equal to or less than the recording rate. Note that in the FIG. 6 embodiment, Null packets 49 are added. If substituted for the remuxer 80 in the FIG. 3 embodiment, Null packets would have to be deleted 82. This superfluous addition and deletion of MPEG Null packets is avoided in the FIG. 7 embodiment.

In the block diagrams of the figures, only the data flow is shown by the arrows. Those skilled in the art will understand that several of the blocks are interconnected for command and control signals that are not shown in the figure.

As previously indicated, the invention is also applicable to other data formats and other ways of preserving the critical timing data. It will also be appreciated that the circuitry and hardware to implement the various blocks shown, including software to the extent needed, will be evident to those skilled in the art not only from the detailed information supplied in the referenced related applications, but also from the below listed references, whose contents are also incorporated herein by reference:

(1) European patent application no. 492,704 (PHN 13.546)

(2) European patent application no. 93.202.950 (PHN 14.241)

(3) European patent application no. 93.201.263 (PHN 14.449)

(4) Grand Alliance HDTV System Specification, Draft document, Feb. 22, 1994.

(5) U.S. Pat. No. 5,142,421 (PHN 13.537)

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A method of processing a first transport stream of transport packets of valid timing-critical-information, and of unknown transport rate that may be of varying rate or bursty, to form a second transport stream of transport packets of known constant rate and of valid timing-critical-information, said second transport stream being supplied to and consumed by at least one target apparatus having a target buffer with a known read-out rate, comprising the steps:

(i) providing a packet scheduler and providing to the scheduler the leak rate of the target buffer, (ii) processing the transport packets of the first transport stream in a serial manner through the scheduler to produce the second transport stream, said scheduler monitoring the target buffer and delivering the transport packets in the second transport stream to the target buffer timed so as not to overflow the target buffer.

2. A method as claimed in claim 1, further comprising the step:

(iii) modifying the timing-critical-information in the transport packets of the second transport stream to take into account the processing delays encountered in step (ii).

3. A method as claimed in claim 1, further comprising an asynchronous channel located downstream of the scheduler and before the target buffer, said scheduler delivering the second transport stream to the target buffer via the asynchronous channel.

4. The method of claim 3, wherein the first transport stream is an MPEG data stream, and the channel is a digital VCR.

5. A method as claimed in claim 1, further comprising at least some of the packets in the first transport stream having a PCR, and restamping those packets with a new PCR at the time the second transport stream is formed.

6. A method of processing a first transport stream of transport packets having a PCR comprising plural bits representing valid timing-critical-information, and of unknown transport rate that may be of varying rate or bursty, to form a second transport stream of transport packets of known constant rate and of valid timing-critical-information, comprising the steps:

(i) providing a local clock, (ii) processing the transport packets of the first transport stream in a serial manner while sampling the local clock when one bit of the PCR of each packet is processed and storing the sampled clock time for each packet, (iii) delaying the transport packets to avoid overflowing a downstream buffer, (iv) when ready to deliver the transport packets without overflowing the downstream buffer, re-processing the transport packets while re-sampling the local clock and determining for each transport packet a new sample time corresponding to the time of reprocessing of said one PCR bit and updating the PCR with the new sample time, (v) delivering the transport packets with updated PCRs to form the second transport stream.

7. The method of claim 6, wherein the transport rate of the first transport stream is of the order of 50 Mbps and the transport rate of the second transport stream is of the order of 25 Mbps.

8. A method of transmitting timing-critical data including a program clock reference (PCR) via an asynchronous channel downstream to apparatus including a target buffer having a limited read-out rate, comprising the steps:

(i) receiving the timing-critical data subdivided into a stream of successive transport packets, (ii) determining the arrival time of each of the transport packets, (iii) temporarily storing the transport packets, (iv) computing the times when individual transport packets can be transmitted downstream to avoid overflowing the target buffer, (v) computing the departure time of each of said transport packets and modifying the PCR accordingly, (vi) transmitting downstream the transport packets in accordance with the computations of step (iv).

9. A method as claimed in claim 8, further comprising re-stamping the transmitted transport packets, before transmission, with a new PCR.

10. A method as claimed in claim 8, further comprising:

(1) selecting the desired packets from the incoming transport stream by a filter, (2) storing for the selected packets the sampled arrival time of a local clock, (3) storing the selected transport packets via a local buffer in a packet store, (4) whenever the packet store is empty and there is at least one packet in the local buffer, reading out the first packet in the local buffer and moving same to the packet store while simultaneously passing on to a scheduler information concerning the packet, (5) computing in the scheduler whether outputting of the packet in the packet store will overflow the downstream target buffer and signalling it to a MUX, (6) if the packet store has a packet and the scheduler signals that the target buffer will be OK, selecting in the MUX and reading out the transport packet in the packet store; otherwise, selecting in the MUX and outputting a Null packet from a Null packet generator, (7) modifying the PCR in the transport packet transmitted by the MUX in a PCR re-stamper using the following equation:

$$PCR_{new} = PCR_{old} + (Clock_{current} - Clock_{tagged}) - Delay_{max} \quad (1)$$

where, $PCR_{new}$: New PCR value after restamping;

$PCR_{old}$: Old PCR value before restamping;

$Clock_{current}$: Current Clock value at restamping;

$Clock_{tagged}$: Clock value tagged at reception of the packet;

$Delay_{max}$: Maximum delay through restamping, which is a constant value to ensure that each PCR value never increases.

11. A method as claimed in claim 10, wherein said scheduler operates by knowing the read-out rate of the target buffer, by computing the downstream target buffer fullness at an output transport rate, and by delaying the transmission of any transport packets if the computation indicates that the target buffer will overflow.

12. A method as claimed in claim 10, further comprising means to record the selected packets, further comprising the steps:

(viii) tagging the transport packets having the modified PCR with a sequence of arrival (SOA) tag, (ix) transmitting the tagged packets to a recorder.

13. Apparatus for generating from an incoming unknown first transport stream of transport packets having a PCR and of valid timing-critical-information a fixed-rate constant second transport stream comprising a sequence of transport packets comprising a PCR for delivery to a target buffer having a maximum read-out rate, comprising:

(a) filter means for receiving the first transport stream for passing the transport packets desired to be included in the second transport stream, (b) a local clock measuring time, (c) a transport packet store for receiving the packets of the first transport stream, (d) a scheduler for storing the maximum read-out rate of the target buffer, (e) a first mux connected to the scheduler and to the transport packet store, (f) a source of Null packets connected to the first mux, (g) means in response to the transport packet store being empty and there being at least one transport packet available for moving said one transport packet to the transport packet store, (h) said scheduler being operative to determine whether outputting the transport packet in the transport packet store will satisfy a first condition that it will not overflow the target buffer or a second condition that it will overflow the target buffer and signalling the first mux that the transport packet in the transport packet store will satisfy the first or the second condition, (i) said first mux being operative in response to the signalling from the scheduler of the first condition to select and read out the said transport packet from the transport packet store and output it and in response to the signalling from the scheduler of the second condition to select a Null packet from the Null packet source and output it, (j) packet restamping means connected to the clock means and connected to receive the transport packets outputted by the mux for re-stamping said transport packets with a new PCR value.

14. Apparatus as claimed in claim 13, further comprising a recorder, means to tag the outputted transport packets with an SOA tag, means to record the tagged transport packets.

* * * * *